July 21, 1931. G. E. A. HALLETT 1,815,619
CONTROL MECHANISM FOR BRAKE BOOSTER CYLINDERS
Filed Aug. 6, 1927

Inventor
George E. A. Hallett
By Blackwood, Spencer & Hurd
Attorneys

Patented July 21, 1931

1,815,619

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

CONTROL MECHANISM FOR BRAKE BOOSTER CYLINDERS

Application filed August 6, 1927. Serial No. 211,118.

This invention relates to brakes and has been designed as an improved brake for motor vehicles.

Specifically the invention is concerned with a means for applying brakes which may be of the conventional band or shoe type and may be applied to the transmission or to brake drums carried by the wheels.

An object of the invention is to make use of a source of energy additional to the manual effort exercised by the operator. Another object is to maintain a predetermined ratio between the manual effort and the additional power means. A further object is to make use of engine suction as an additional source of energy. The invention provides an arrangement whereby the "feel" is always a measure of brake application. The arrangement is intended to permit unassisted manual brake application through mechanical linkage in the event of failure of engine suction. A still further object is to counteract the lag which is commonly found in fluid pressure and vacuum brakes.

Other objects and advantages will appear as the description proceeds.

Although primarily intended for use with vacuum-operated brakes, it is to be understood that this invention is not limited to that specific use.

The drawings show in Figure 1 somewhat diagrammatically a side elevation of parts comprising my invention.

Figure 1:
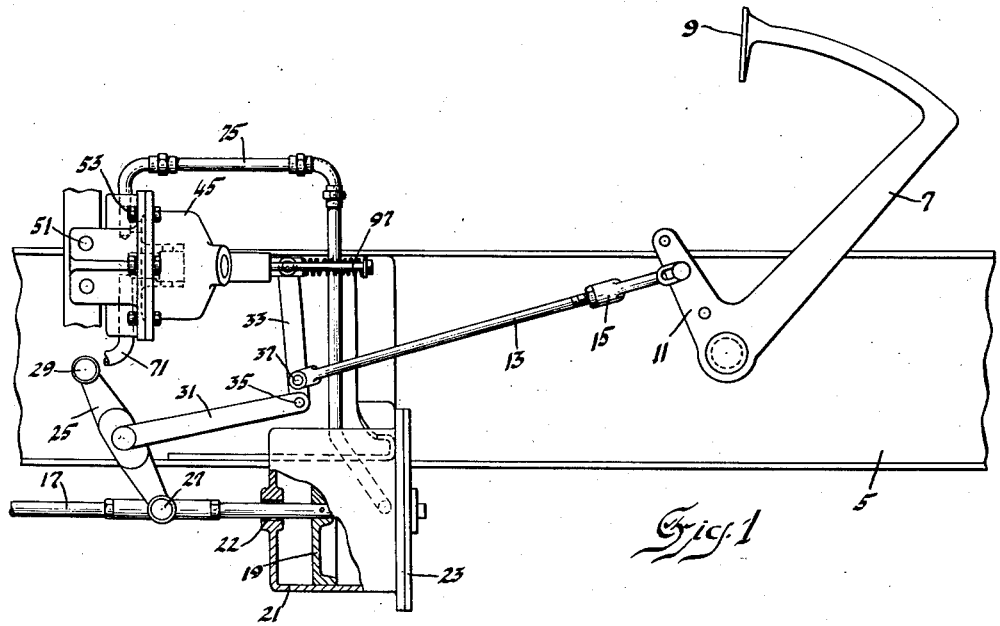
Figure 2:
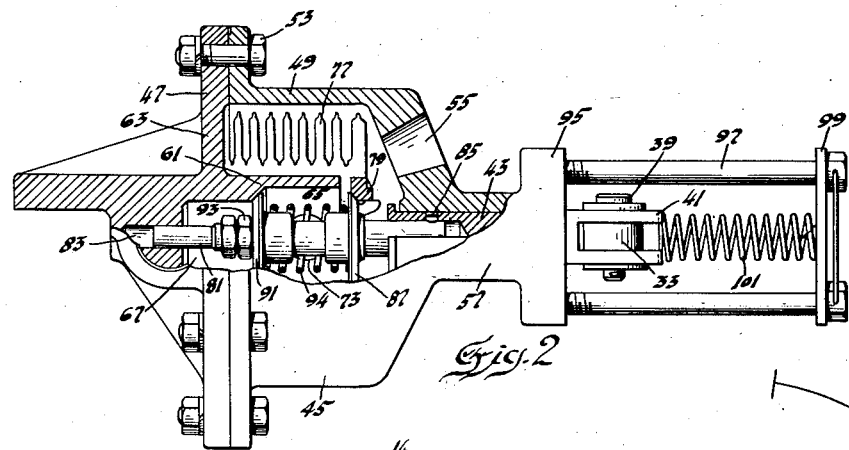
Figure 2 shows an improved reaction valve in elevation, parts being broken away and parts in section, the valve being in active position.

Referring to Figure 1 and Figure 2, numeral 5 designates a chassis frame member. 7 is a lever having a pad 9 for receiving the pressure from the foot. The lever 7 is illustrative of any manually operating member. Lever 7 has an arm 11 to which is connected a rod 13. For adjusting purposes rod 13 may be provided with a turnbuckle 15.

A rod 17 is shown to represent any suitable brake operating rod. It may be assumed that this rod is connected to any sort of brake-operating mechanism. Rod 17 is connected to the piston 19 in a brake cylinder 21. The rod 17 passes through an opening 22 in one cylinder head, there being sufficient space around the rod to permit entrance and escape of air. The opposite end of cylinder 21 is provided with a head 23, tightly sealing that side of cylinder 21 on the right of piston 19 as shown in Figure 1. Lever 25 may be pivoted to rod 17 at 27 and is itself pivoted at any convenient point on the vehicle as at 29. Pivoted to lever 25 at or near a mid-portion thereof is a rod 31. Rod 31 is pivotally connected to the end of a floating lever 33 as at 35. Rod 13 is similarly connected to lever 33 at 37, points 37 and 35 being located closely adjacent each other. Floating lever 33 is pivoted at its other end by means of a pin 39 (see Figure 2) to the forked end 41 of a stem 43 slidable in the reaction valve 45.

The structure of the valve is best shown in Figure 2. It is conveniently made of two parts 47 and 49. Part 47 has attaching means 51 (as shown in Figure 1) and the two parts are secured together by bolts 53. Part 49 is hollow, has an opening 55 to the air and also has an opening in the neck portion 57 for the passage of stem 43. Part 47 has a tubular portion 61 projecting into part 49 from a wall 63. The tubular portion 61 comprises a part of larger diameter 65 and a part of smaller diameter 67. Part 47 has an opening communicating by means of a conduit 71 with a source of sub-atmospheric pressure, as for example with the engine intake manifold. This valve member 47 also has an opening which communicates by means of a conduit 75 with the cylinder 21 on the closed side of the piston. Conduits 71 and 75 both enter part 47. One conduit 71 communicates with chamber 67 to the left of valve 91 described below, and the other conduit 75 communicates with the interior of the bellows outside portion 61.

Within the two parts 47 and 49 is a collapsible bellows 77. At one end the bellows is fixed into position as by being clamped between the sections 47 and 49. A valve seat 79 is carried by the other end of the bellows. The bellows is always in communication with the interior of tubular portion 61 by one or more openings 73.

A rod 81 is slidably mounted in an opening 83 bored out of part 47 beyond the chamber portion 67. This rod extends through both chambers 67 and 65 and is secured by fastening means 85 in an axial opening in the end of rod 43. Rod 81 has rigidly secured thereto a valve member 87 to engage at times the valve seat 79. Slidably mounted on rod 81 is a valve member 91, its sliding movement in one direction being limited by nuts 93. The spring 94 is in abutment with valve member 87 and normally exerts tension against valve member 91 holding it in engagement with its seat formed on the shoulder between chamber portions 65 and 67. It will be seen that a movement of stem 43 to the right in Figure 2 may serve to seat valve member 87 and may simultaneously or subsequently lift valve member 91 from its seat by means of the nuts 93. The extremity 95 of part 49 carries threaded therein a pair of bolts 97 upon which is mounted a cross-head 99 engaging the heads of said bolts. A coil spring 101 is located between the bolts 97, engages the cross-head 99 for one abutment and also engages the forked end of stem 43, the spring normally functioning to push the stem toward the left, as in Figure 2, thereby holding valve member 91 closed and valve member 87 open. Under these circumstances it will be apparent that atmospheric air is admitted to the collapsible bellows and that the subatmospheric pressure of the engine manifold is prevented by valve member 91 from entering the brake cylinder 21.

The operation is substantially as follows. In the brake released position spring 101 is functioning to hold stem 43 inwardly and spring 94 is holding valve member 91 closed against its seat as explained above. Valve member 87 is off its seat 79 and the air within the bellows is substantially at atmospheric pressure, as is also the air within the closed side of brake cylinder 21.

If now the pedal 9 is depressed it pulls upon rod 13. The greater part of this initial manual effort is directly applied to the brake rod 17 through the mechanical leakage, owing to the fact that point 35 is closely adjacent the point 37. Nevertheless the manual effort is divided by lever 33, one component of the force of application pulling stem 43 against spring 101. This outward movement of stem 43 causes a like movement of rod 81, closes valve member 87 against its seat, and by means of nuts 93 opens valve member 91. Inasmuch as the pressure within chamber 65 is greater than that within chamber 67 an appreciable effort is thereby exercised by the operator in opening valve member 91 in addition to the effort used to overcome the tension of spring 101. Engine suction is now effective through the bellows 77 and cylinder 21 upon the piston 19 to move the latter and its rod 17. This greatly augments the manual effort of brake application through the mechanical linkage.

The movement of piston 19 tends, of course, to swing lever 25 counter-clockwise as shown in Figure 1. If points 39 were fixed this would tend to sink the pedal downwardly away from the foot of the operator and would confuse him as to the condition of his brakes. Under such circumstances he would know of the action of the brakes only by their effect upon the car travel and would lack the "feel" through the pedal upon his foot as a measure of the intensity of brake application. Such a result is avoided by the arrangements provided. Simultaneously with the reduction of pressure in cylinder 21 is, of course, the reduction of pressure within the bellows. It will be remembered that because of the opening 55 the bellows is externally subject to atmospheric pressure and that the space within the bellows is now at sub-atmospheric pressure. The floating end carrying the valve seat 79 is therefore free to move to the left in Figure 1 under the influence of this pressure differential. Such a movement of valve seat 79 moves the stem 81 through the valve member 87 to the left and permits the spring 94 to close the suction intake valve member 91. This movement, together with the movement of link 31 influenced by its connection with the piston of the brake cylinder, swings lever 33 about its pivot 37. With a given movement of the pedal the operator has thus applied a brake manually with a given force and brought into action a supplementary force having a fixed ratio to the force of mechanical brake application. The suction valve member has thus closed, but the exhaust valve 87 remains closed also so that a balanced position has been reached. For each further movement of the pedal there is an additional mechanical application of the brake and an additional application of the brake through the suction means and at all times a definite ratio exists between the forces applied by the two brake applying agencies. The added tension through the mechanical linkage for continued brake application gives the operator the "feel" which is the measure of the degree of brake application.

Figure 3:
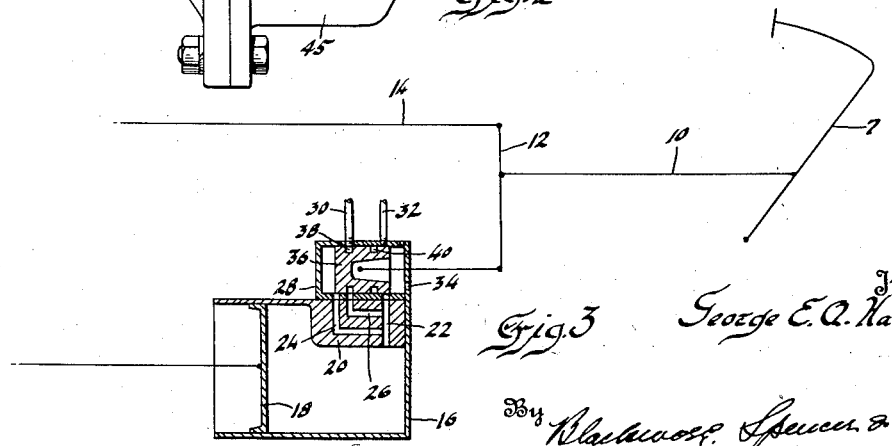
Figure 3 is a diagrammatic view of a modified form.

In Figure 3 is a form of the invention where the valve is in the form of a sliding piston instead of a flexible bellows. In this form the valve is directly associated with the brake cylinder. The pedal 7 has a rod 10 connected to a point on a floating lever 12 near the connection of the latter with a rod 14 which may be connected to any sort of brake-operating mechanism, the connection of rod 14 with the brakes themselves not being a part of this invention.

The power cylinder 16 closed at one end is provided with a piston 18 having a rod passing through the open end. This rod may be similarly connected to an arm on the rock shaft or in some other conventional manner connected with the brakes. Within the closed end of the cylinder and beyond the range of movement of the piston 18 is a block 20 which may be rigid with or secured to the cylinder. Block 20 has a radial passage 22 extending from within to the outside of cylinder 16. It has two angular passages 24 and 26 affording communication between spaced openings along the outer side of the cylinder and the before mentioned radial passage 22. Adjoining the power cylinder 16 is a valve cylinder 28. This cylinder has spaced openings 32 and 30, the latter open to the atmosphere and the former connected to the intake manifold. One end of the cylinder 28 has an opening 34. Through this same end extends a piston rod, its outer end connected with the long arm of lever 12. The piston rod moves a piston 36 having two circumferential grooves 38 and 40.

The operation of this form of the invention is substantially the same as the operation of the form already described. In the position of parts illustrated atmospheric air communicates with the interior of cylinder 16 by means of pipe 30, groove 38, passage 26 and passage 22. By means of air vents both ends of cylinder 28 are at atmospheric pressure. This is accomplished by the opening at 34 on one side of the piston and by means of passages 22 and 24 on the other side, passage 22 being in communication with the atmosphere by means of conduits 26, 38 and 30 as explained above. If the pedal is depressed the brake is directly operated through the short arm of lever 12 as in the form already described and the long arm moves piston 36 so as to open the engine suction through passages 32, 40, 22 into the cylinder 16, thus permitting air on the outer side of piston 18 to move the latter and assist in brake application. At the same time the reduced pressure is open to the inner end of cylinder 28 through the passage 24. The suction on one side of the piston 36 and the air pressure on the other, associating with the movement of brake connection 14 caused by the action of the power cylinder results in the rotation of lever 12 about its pivotal connection with connecting link 10. The vacuum is thus cut off from the cylinder 16 and a condition of balance is reached as in the case already described. Repeated pedal movements add to the force of brake application, both through the direct mechanical connection and through the vacuum booster. In each case there is the same division between the two actuating agencies and the same "feel" present at the pedal. When the pressure is released from the pedal the parts return to their released position as shown in Figure 3 in which the cylinders 16 and 18 are both restored to atmospheric pressure.

I claim:

1. For use with a vacuum-operated device, a valve, said valve comprising a chamber, a collapsible bellows within said chamber, said chamber having an opening to the atmosphere outside said bellows, a stem reciprocable through said chamber and bellows, a valve member fixed to said stem to at times exclude air from entering said bellows, a second valve member slidable on said stem, a valve seat at times engaged by said second valve member to divide the space within the bellows into two compartments, one of said compartments adapted to be connected to a suction source, the other compartment adapted to be connected to a power cylinder and manually movable means to actuate said stem.

2. For use in a vacuum operated device, a reaction valve therefor, said valve comprising a chamber formed of two parts and a bellows, one end of said bellows being clamped between said two parts, a valve seat carried by the other end of said bellows, said chamber having an opening giving free communication between the outer air and with a portion of the chamber outside the bellows, a stem reciprocable through said chamber and bellows, valve members on said stem, one of said valve members co-operating with said valve seat to close the communication between the parts of said chamber within and without said bellows, a second valve member on said stem, a valve seat therefor within said bellows, said second valve member at times engaging its seat and dividing the space within the bellows into two compartments, one compartment being adapted to be connected to a source of suction, the other compartment being adapted to be connected to a power cylinder whereby the valve may control the fluid pressure content of the power cylinder.

3. For use with a power-operated device, a power cylinder, a valve, said valve comprising a chamber formed by two parts, a collapsible bellows within said chamber, one end of said bellows being clamped between parts of said chamber, said valve including two valve members, one to at times cut off atmospheric air from entering said bellows and a valve seat for the other valve member at times engaged thereby to separate the bellows into two compartments, a suction pipe for one compartment, a pipe from the power cylinder to the other compartment, a valve seat carried by the other end of said bellows cooperating with one of said valve members, together with a reciprocating stem movable through said chamber and bellows, said valve members positioned on said stem, one of said valve members being fixed, an abutment on said stem to engage the other valve member, a single spring between said valve members, and yielding means to normally hold the atmospheric valve member open.

4. In a vacuum brake or the like, a valve, said valve comprising a chamber formed by two parts, a collapsible bellows within said chamber, one end of said bellows being clamped between said parts of said chamber, said valve including two valve members, one to at times cut off atmospheric air from entering said bellows and a valve seat for the other valve member at times engaged thereby to separate the bellows into two compartments, one compartment adapted to be connected to a source of suction, the other compartment adapted to be connected to a power cylinder, a valve seat carried by the other end of said bellows cooperating with one of said valve members, together with a reciprocable stem movable into said chamber and bellows, said valve members positioned on said stem, one of said valve members being fixed, an abutment on said stem to engage the other valve member, and a single spring between said valve members.

5. The invention defined by claim 4 having, associated therewith, yielding means to normally hold the atmospheric valve member open.

In testimony whereof I affix my signature.

GEORGE E. A. HALLETT.